United States Patent [19]

Hansen

[11] Patent Number: 4,998,848
[45] Date of Patent: Mar. 12, 1991

[54] METHOD AND APPARATUS FOR REMOVING GROUND CONTAMINANTS

[75] Inventor: Robert G. Hansen, Goleta, Calif.

[73] Assignee: R. G. Hansen & Associates, Santa Barbara, Calif.

[21] Appl. No.: 329,183

[22] Filed: Mar. 27, 1989

[51] Int. Cl.⁵ ............................................. B09B 1/00
[52] U.S. Cl. ...................................... 405/128; 55/387; 62/260; 405/130
[58] Field of Search ............... 405/128, 129, 130, 303; 62/260, 45.1; 166/57; 210/170, 282; 55/387, 316

[56] References Cited

U.S. PATENT DOCUMENTS

| | | | |
|---|---|---|---|
| 3,943,722 | 3/1976 | Ross | 405/130 |
| 4,129,431 | 12/1978 | Ross et al. | 405/130 X |
| 4,157,016 | 6/1979 | Wendt et al. | 405/130 X |
| 4,195,524 | 4/1980 | Hansen | 73/421.58 |
| 4,582,516 | 4/1986 | Kadi | 55/387 X |
| 4,582,609 | 4/1986 | Hunter et al. | 210/170 X |
| 4,597,444 | 7/1986 | Hutchinson | 405/130 X |
| 4,619,673 | 10/1986 | Cullen et al. | 55/387 |
| 4,660,385 | 4/1987 | Marcriss et al. | 55/387 X |
| 4,676,694 | 6/1987 | Karinthi et al. | 405/130 |

Primary Examiner—Dennis L. Taylor

[57] ABSTRACT

A method and apparatus for removing fluid contaminants from a solid material is described. In a preferred embodiment, a cylindrical container having openings in its surface through which contaminants in a gaseous state may enter is filled with cyro-adsorbing substances, for example, charcoal, and placed into a correspondingly-sized hole formed in the solid material from which the contaminants are to be removed. A cryogenic fluid, for example liquid nitrogen, is introduced into the container, thereby cooling the cyro-adsorbing substance so that molecules of contaminants are cyro-adsorbed from the solid material. After the adsorption of contaminants, the container is removed from the solid material and the cyro-adsorbing substance is regenerated, or regeneration is effected in situ. This invention has utility in the field of removing contaminants, such as for example gasoline or other harzardous or toxic materials, from the ground.

28 Claims, 2 Drawing Sheets

METHOD AND APPARATUS FOR REMOVING GROUND CONTAMINANTS

BACKGROUND OF THE INVENTION

1. Field of the Invention

The present invention is concerned with the field of removing fluid contaminants from solid materials, and in particular, with a method and apparatus for removing such contaminants from the ground in an economical and ecologically safe manner.

2. Description of the Art

Soil contamination resulting from petrochemical spills, toxic waste spills, radioactive wastes, and other chemicals presents a potentially serious problem. Such contaminants may find their way beneath the surface of the earth to the level of the water table below, thereby contaminating such water with potentially catastrophic and expensive consequences. A particular hazard is presented by underground storage tanks used for the storage of gasoline, solvents and other petrochemicals. Because the storage tanks are so often underground, leaks that may develop as a result of corrosion or earth movement may remain undetected for significant periods of time, during which the hazardous materials stored in such tanks continue to seep into the ground presenting a threat to the water table. In some cases, such tanks become abandoned and forgotten, often while some of the hazardous materials remain inside.

Presently, when it is discovered that an underground tank being used for the storage of petrochemicals or other toxic material is contaminating or presenting a serious danger of contaminating the soil, the tank and the contaminated soil are both removed. First, the ground surface above the tank, which may be asphalt or concrete, is removed. The tank is then drained of any residual fluid and partially backfilled with an absorbent agent before the tank is removed from the ground. The ground around the tank is then profiled to determine where the soil has been contaminated from the leakage from the tank. The contaminated soil is then removed from the ground, loaded in trucks, and hauled from the site. Other soil must be brought in to replace that which is removed. However, as the removed soil is still contaminated, there still remains a problem of what to do with the contaminated soil. Presently, in some instances, such soil is trucked several hundreds miles or more. The soil is spread in a relatively thin layer over the surface of the desert, for example, where the level of the water table is located at some depth below the surface of the earth and where the contaminated soil may be aerated so that the contaminated materials are eventually evaporated, assisted by the heat in the desert environment. It will be appreciated that the removal of soil in such a manner, at least for the short term, merely results in the contaminated soil being relocated at considerable expense and the problem not being eliminated.

It will be appreciated that not only is the present method of eliminating contaminants from the ground by in fact removing the contaminated ground expensive because of the necessity of having to haul the contaminated soil to another area, but in some cases, such soil may not be able to be removed without presenting a danger to nearby structures which may require that earth for their support.

Similar problems attend the remedying of soil contamination resulting from spills of petrochemicals or other toxic materials and radioactive material. Such materials may form plumes having a migratory nature, i.e., moving vapor clouds within the earth, that may eventually find their way to the water table or to other locations where they may present a threat to health and safety.

It is therefore a primary object of the present invention to provide a method and apparatus for removing contaminants from the soil in an efficient and ecologically sound manner in which most of the contaminated soil need not be removed from the ground. Another object of the present invention is to enable the removal of contaminants from the ground in a manner which allows their collection and subsequent disposition, if desired. An additional object of the present invention is to provide a method and apparatus by which the level of the ground contamination may be monitored, so that the process of removing the contamination may be terminated when a level of contamination below that which is considered unsafe is all that remains. Still, an additional object of the present invention is to achieve the above objects in a manner which may provide benefits to the soil through induced aeration and the introduction of nitrogen gas.

More generally, the present invention has for an object the providing of a method and apparatus for the removal of fluid contamination from an essentially solid material, the removal of contaminants from the soil being an important example.

SUMMARY OF THE INVENTION

The present invention provides a method and apparatus for removing gaseous or vaporizable contamination from a solid material through which vapor molecules may travel in a manner that does not require the wholesale removal of the contaminated solid material. In accordance with the present invention, a container for holding a cryo-adsorbing substance is provided. The container has a surface for placement adjacent to the contaminated solid material through which gaseous contaminants may enter the container. The cryo-adsorbing substance is cooled so that molecules of the contaminant gases entering the container are cryo-adsorbed by the substance, thereby being removed from the solid material.

In particular, the removal of contaminants from the ground may be accomplished, in a preferred embodiment of the present invention, by utilizing a cylindrical container whose cylindrical surface is provided with openings through which molecules of contaminants may enter the container. The container is filled with a cryo-adsorbing substance, such as granules of charcoal which provide a large surface for adsorption. A hole is bored into the ground of approximately the same diameter as the cylindrical container and the cylindrical container inserted therein. Thereafter, a cryogenic liquid, preferably liquid nitrogen, is introduced into the cylindrical container, cooling the charcoal granules so that efficient cryo-adsorption of the molecules of gaseous contaminants occurs. According to the preferred embodiment of the present invention, the temperature of the cryo-adsorbing substance is monitored, so that the container may be removed from the soil and the contaminants desorbed from the cryo-adsorbing substance. During the desorbing procedure, the contaminants may be analyzed as to species and quantity, so that a determination may be made as to the level of remaining contamination and the advisability of continuing the contamination removing procedure according to the present invention. Alternately, procedures to desorb contaminants from the cryo-adsorbing substance in situ may be utilized.

More generally, the present invention may be utilized with respect to other solid materials to remove contaminants therefrom.

DETAILED DESCRIPTION OF A PREFERRED EMBODIMENT

Figure 1:
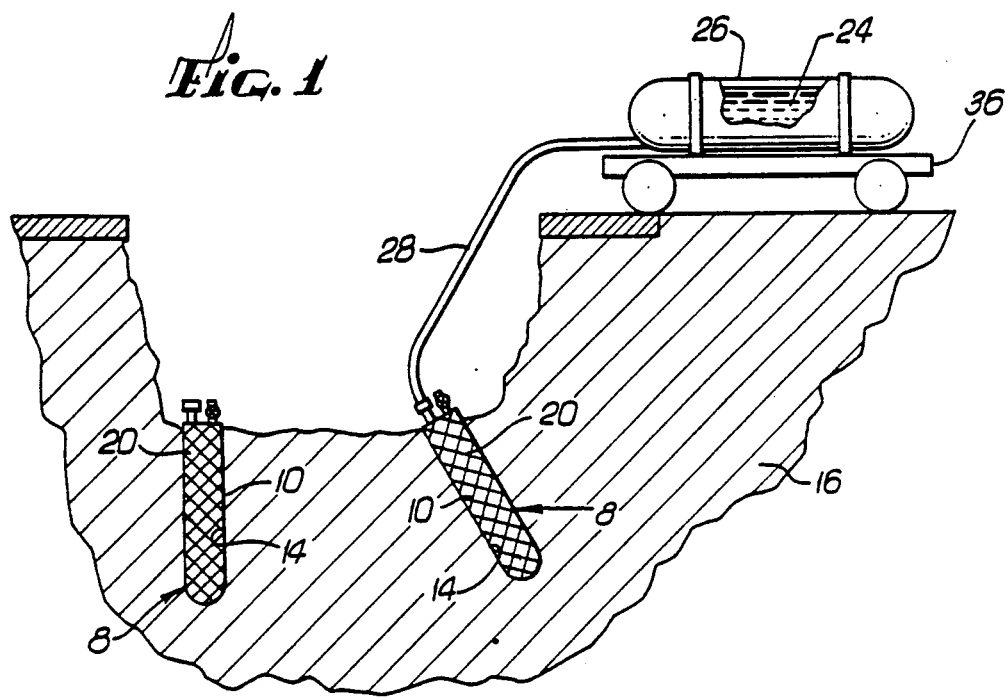
FIG. 1 is a schematic view of the apparatus of the preferred embodiment of the present invention as it might be utilized in order to remove subsurface contamination at a site where a tank for storing gasoline or the like was previously buried.
Figure 2:
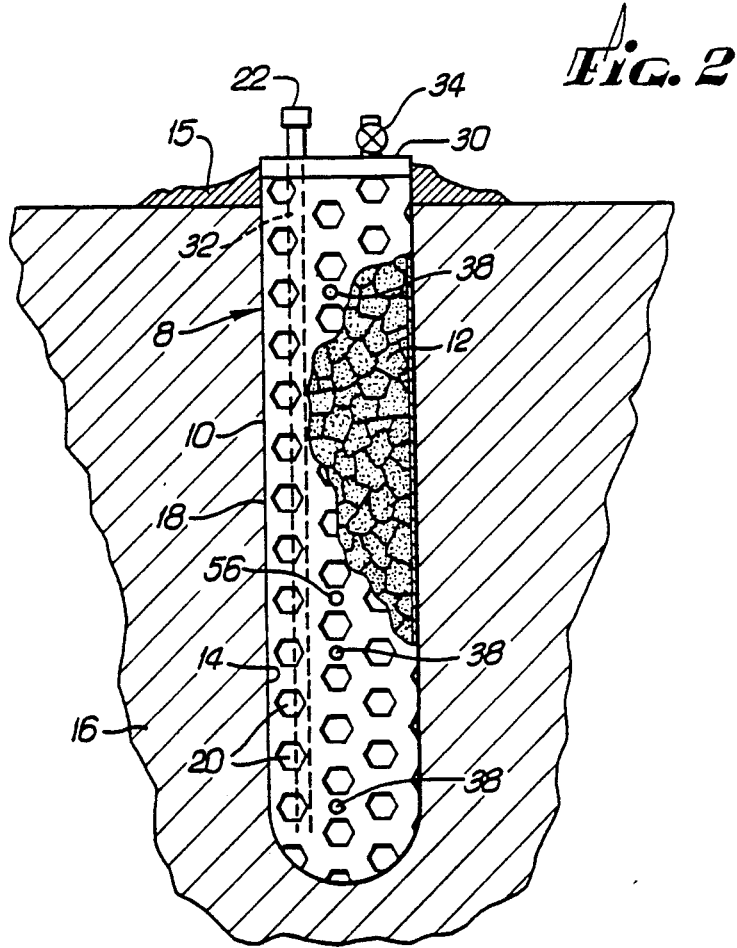
FIG. 2 is a schematic view of the cartridge of the preferred embodiment of the present invention shown disposed in the ground and partially cut away.

A preferred embodiment of the method of the present invention, described with respect to ground which has been contaminated by seepage from an underground storage tank which has been removed, can be understood with reference to FIGS. 1 and 2. A cartridge 8 comprising a container 10 holding a cryo-adsorbing substance 12, the lateral surface 18 of the container 10 being provided with openings 20, is placed into a hole 14 in the ground 16 such that the surface 18 is adjacent to the ground. Through an inlet 22 located in the top of the container 10, a cryogenic liquid 24 from a dewar 26 is pumped into the container 10 through delivery line 28 so that the cryo-adsorbing substance 12 is cooled by the liquid 24. The temperature to which the cryo-adsrobing substance 12 is cooled by the liquid 24 is such as to render the cryo-adsorbing substance 12 an efficient cryo-adsrober of molecules of contaminants which traverse the openings 20 in the cartridge 8.

Referring to FIG. 2, the cartridge 8 of the preferred embodiment of the present invention is shown. Cartridge 8 comprises a container 10 that is preferably essentially cylindrical in shape. The cylindrical lateral surface 18 of container 10 is provided with openings 20 over that portion of surface 18 which is to be inserted into the ground 16. As the openings 20 are to permit contaminants in gaseous form to enter the container 10 to be adsorbed and thereby removed from the ground 16, it is preferable to have as much of the surface 18 as possible consist of openings 20 as may be permitted and still maintain the structural integrity of container 10, which must be filled with material as will be described, as well as placed in the ground and otherwise handled. The container 10 may be fabricated of a metal material, such as stainless steel or the material commonly referred to "G-10", although it is to be understood that other structural materials may be utilized, and in specific circumstances may be preferred.

The openings 20 may actually comprise larger openings in the lateral surface 18 over which screen material or other material porous to the contaminants to be removed is placed.

The cylindrical shape of container 10 is preferred, as holes placed into the ground and into other materials are generally cylindrical. As the hole 14 in the ground 16 may be formed by an apparatus for digging post holes or for drilling wells, the container 10 may advantageously be sized to be accommodated in such a hole 14. It is within the scope of the present invention, however, to have containers that are otherwise sized and shaped.

Container 10 has an endplate 30 provided with an inlet 22 through which a liquid cryogen may be introduced into container 10. A tube 32 extends from inlet 22 toward the bottom of container 10 to facilitate the introduction of a cryogenic liquid 24 into container 10, as is well known in the art. An outlet valve 34 is also provided in endplate 30 to facilitate the purging of container 10 as will be described.

A cryo-adsorbing substance 12 is placed within container 10. The presently preferred cryo-adsorbing substance 12 is charcoal. In order to maximize the surface area available for adsorption, the charcoal 12 is preferably selected to comprise pieces of charcoal whose relation to the holes 14 is such that the pieces of charcoal are at least unlikely to be inadvertently dislodged from container 10 through holes 14. Container 10 is essentially filled with the charcoal 12 to make up the cartridge 8.

It is within the scope of the present invention to use materials other than charcoal as the cryo-adsorbing substance 12, including substances and materials which have not yet been developed. These materials are known as "getters". Another getter material is zeolite. Sintered formed carbon is another material having cryo-adsorbing capability. Presently, charcoal referred to as activated charcoal is preferred. It should be understood herein that "cryogenic" is used herein in a relative sense to refer to a temperature differential between the cryo-adsorbing substance 12, such as charcoal, and the solid material, such as the ground 16. The present invention is not limited in potential applicability to situations where the temperature of the solid material is within the range normally experienced in the preferred embodiment.

Referring again to FIG. 1, a dewar 26 for holding a cryogenic liquid 24 is schematically illustrated. In the preferred embodiment of the present invention, cryogenic liquid 24 is liquid nitrogen, which has a boiling point of approximately 77° Kelvin (°K.). Liquid nitrogen 24 is an inexpensive, readily available cryogenic liquid, which may be delivered to the site where the contaminants are to be removed from the ground 16 in large dewars or by truck 36. Typically, a vacuum-jacketed delivery line 28 is connected between the dewar 26 and the inlet 22 for cartridge 8, as is well known in the art. The liquid nitrogen 24 introduced into container 10 through inlet 22 cools the charcoal 12 so that the charcoal 12 becomes an efficient cryo-adsorber compared to such substance in an uncooled state. It is of course within the scope of the present invention to use other cryogenic materials.

The present invention operates on the principle that when a cryo-adsorbing substance 12, such as charcoal, is cooled by a cryogenic liquid 24, such as liquid nitrogen, molecules which strike the cryo-adsorbing substance 12 have a likelihood of adhering thereto, the degree of likelihood depending on the cryo-adsorbing substance 12, its temperature, and the particular molecule. This likelihood is quantified in a factor known as the sticking coefficient. In addition, as molecules in the vicinity close to the cryo-adsorbing substance 12 strike and adhere to the cryo-adsorbing substance 12, a partial vacuum is created in the area of cryo-adsorbing substance 12, drawing other molecules to the area where they may also be cryo-adsorbed. The partial vacuum increases the vapor pressure of contaminants that are subject to the partial vacuum, so that molecules of such contaminants that are not vaporized have an increased likelihood of vaporizing and thus being cryo-adsorbed.

After the contaminant adsorption cartridge 8 is placed into the hole 14, soil or other material is placed adjacent the top portion of the cartridge 8 to form a partial seal 15 to reduce the condensation of gases from the atmosphere on or in the cooled cartridge 8.

As mentioned, liquid nitrogen 24 is introduced into cartridge 8 to cool the charcoal 12 initially to a temperature at the boiling point of nitrogen, approximately 77° K. Once container 10 is filled with liquid nitrogen 24 a valve at inlet 22 is closed and the delivery line 28 of dewar 26 may be removed from inlet 22. Thereafter, as the cryo-adsorbing activity of charcoal 12 continues, charcoal 12 will gradually experience a temperature rise and liquid nitrogen 24 within the cartridge 8 will boil away. As the temperature of charcoal 12 rises, its effectiveness as a cryo-adsorbing substance decreases and the likelihood that adsorbed molecules may be desorbed increases. Therefore, the temperature at one or more points within container 10 is preferably monitored while cartridge 8 is in the ground 16. In a preferred embodiment, temperature sensors 38 are disposed at three positions along the length of container 10 to monitor the temperature therein. Temperature sensors 38 may be of types well known in the art to monitor low temperatures, and as is well known in the art, provided with remote readouts. At a predetermined temperature sensed by one or more of the temperature sensors 38, cartridge 8 is removed from the hole 14 in the ground 16. Such a predetermined temperature is selected based on the determined acceptable efficiency of cryo-adsorption for the contaminants of concern. Alternatively, cartridge 8 may be removed after a predetermined amount of time.

Figure 3:
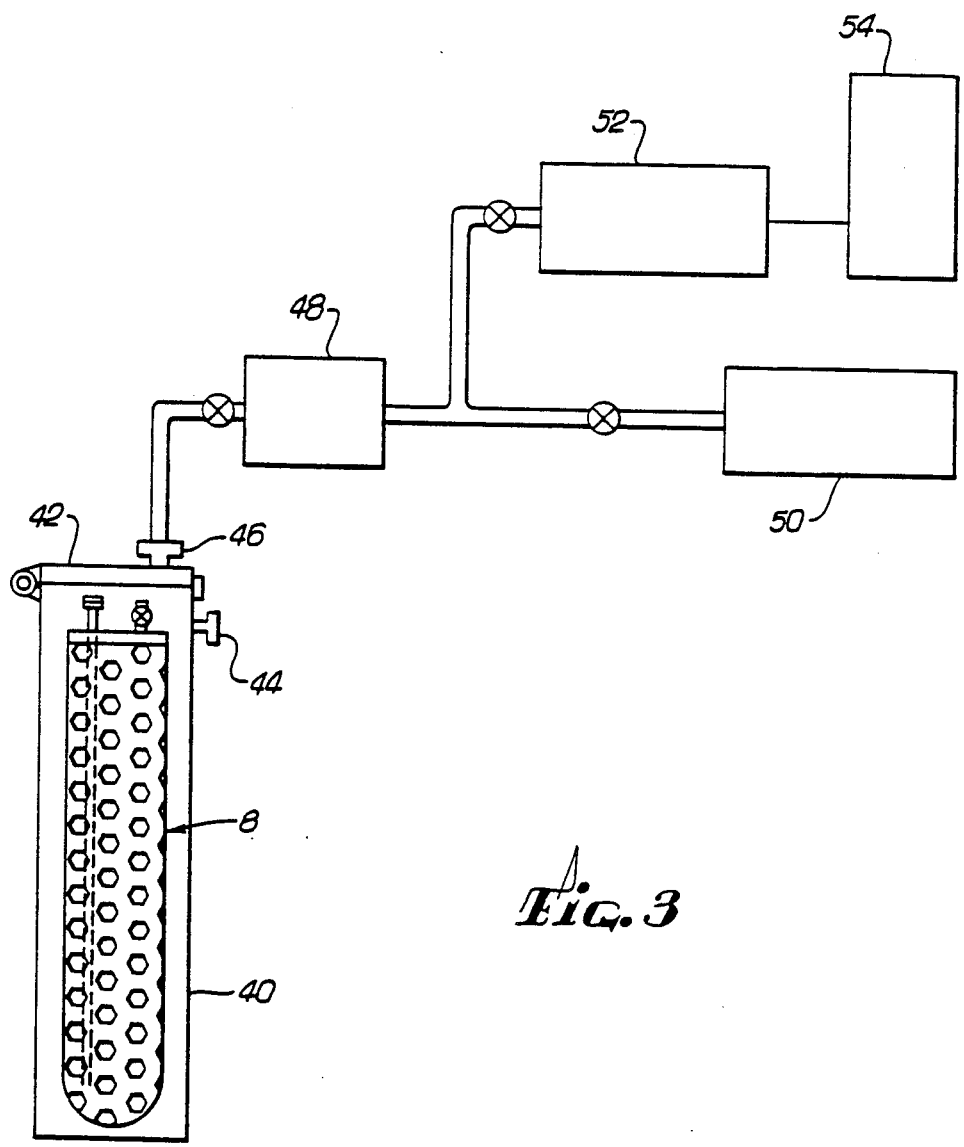
FIG. 3 is a schematic view of apparatus according to the preferred embodiment of the present invention for regenerating the cryo-adsorbing substance and monitoring and collecting gases desorbed during the regeneration process.

In the preferred embodiment, after removal from the ground 16, cartridge 8 is placed in a regeneration chamber 40 shown schematically in FIG. 3. In the preferred embodiment, regeneration chamber 40 is an open-topped stainless steel container provided with a hinged cover 42 which may be sealingly closed over the top of regeneration chamber 40. Regeneration chamber may obviously be formed of different materials and take different configurations. Regeneration chamber 40, however, is sized to accommodate cartridge 8 which is inserted therein through the open top which is then sealingly closed by hinged cover 42. A releif valve 44 and a port 46 for vacuum pump out is also provided. The port 46 is connected through a liquid nitrogen trap 48 to a vacuum system 50 which pumps upon the charcoal 12 causing the cryo-adsorbed molecules thereon to desorb. The desorbed molecules may be pumped by vacuum system 50 to a collection system to be disposed of as desired or may be exhausted into the atmosphere. In addition, a gas analyzer 52 may advantageously be connected between the regeneration chamber 40 and the vacuum system 50 so that the species and quantity of specific contaminants may be determined. The gas analyzer 50 may be provided with a readout 54, which may be a visual display or a printed record. The specifics and the utilization of the liquid nitrogen trap 48, the vacuum system 50, the gas analyzer 52 and the readout 54 will vary depending upon the circumstances and may be determined by those of ordinary skill in the art. Using the readout 54, a decision may be made as to whether or not the regenerated cartridge 8 should be replaced into the hole 14 to further remove contaminants from the ground 16 as has been described or whether some other action should be taken.

The preferred embodiment of the present invention has been described with respect to a method and apparatus for removing contaminants from the ground. The present invention, however, is of more general applicability. Contaminants disposed within other solid materials (including herein granulated substances and agglomerations of solid particles) may be removed using the method and apparatus of the present invention, provided the contaminants have a sufficiently high vapor pressure when the invention is utilized and the solid materials are sufficiently porous to the vaporized molecules of the contaminants.

As an alternative to removing the cartridge 8 from the hole 14 in the ground 16 when the temperature sensors 38 indicate that a predetermined level of efficiency of removal of contaminants is not being achieved, the contaminant absorber cartridge 8 may be regenerated in situ. Such regeneration may be accomplished using a gas purge, cryogenic pumping and/or heating in a wide variety of specific ways. For example, with inlet valve 22 closed, a vacuum system may be connected to the opened outlet valve 34 in a manner similar to that shown in FIG. 3 with respect to the cartridge 8 being placed in a regeneration chamber 40. In addition, a heating mechanism 56 may be disposed within the cartridge and activated to heat the cryo-adsorbing substance 12 causing it to desorb the contaminants through outlet valve assisting the vacuum system.

It is within the scope of the present invention that the method and apparatus of the present invention may be utilized in a permanent installation. For example, around and under nuclear storage containment areas, it would be desirable to monitor and/or remove critical seepages from such areas. An apparatus according to the present invention capable of being regenerated in situ may advantageously be disposed beneath and around such areas to control such contamination. The specifics of the design of such apparatus and its operation would of course depend on the particular circumstances.

An additional possible benefit from the use of the present invention in a preferred embodiment using liquid nitrogen resides in the fact that the liquid nitrogen which boils off beneath of the surface of the ground permeates the surrounding soil and may tend to reverse the normal downward seepage path of residual vapors that are not cryo-adsorbed. Also, the nitrogen may activate or aerate the soil allowing contamination in the ground to be more effectively processed by nutrients therein.

It is believed that the present invention is most effective in removing contaminants from the soil when the soil is dry or relatively dry.

While the present invention has been described in terms of a presently preferred embodiment, variations and modifications of the present invention, other than those few which have been described above, exist and are within the scope of the present invention as claimed. By way of further example, it may be preferred to have the cryogenic substance disposed in closed tubes within the container of the contaminant adsorber cartridge, rather than be in actual contact with the cryo-adsorbing substance and subject to escape through the openings in the cartridge. As another example, the cartridge may be formed of a material through which vapors of comtaminants may pass, without macroscopic physical openings therein, if such materials exist or are developed.

I claim:

1. A method for removing fluid contaminants from a solid material comprising the steps of:

providing a container having a surface across which fluid contaminants can enter, said container for holding a cryo-adsorbing substance adjacent said surface, said substance having a cryo-adsorbing capability with respect to fluid contaminants to be removed;

placing said cryo-adsorbing substance in said container adjacent said surface;

placing said surface of said container adjacent to a solid material from which fluid contaminants are to be removed; and cooling said cryo-adsorbing substance with respect to said solid material below the temperature at which said substance is efficiently cryo-adsorbing with respect to said fluid contaminants so that fluid contaminants are adsorbed by said substance and removed from said solid material.

2. A method as in claim 1 wherein the step of cooling comprises placing a liquid that is cool with respect to said solid material in said container.

3. A method as in claim 1 wherein the step of placing said container adjacent to a solid material precedes said step of cooling said cryo-adsorbing substance.

4. A method as in claim 1 wherein the step of cooling said cryo-adsorbing substance precedes said step of placing said container adjacent to a solid material.

5. A method as in claim 1 wherein said surface of said container is cylindrical and said step of placing said container adjacent to said solid material comprises the steps of:

forming a cylindrical hole in said solid material sized to accommodate said container;

and inserting said container into said hole so that said surface is adjacent to said solid material.

6. A method as in claim 1 wherein the step of placing said cryo-adsorbing substance in said container comprises a step of placing charcoal in said container.

7. A method as in claim 2 wherein the step of placing a liquid that is cool with respect to said solid material in said container comprises a step of placing liquid nitrogen in said container.

8. A method as in claim 5 wherein said cryo-adsorbing substance is charcoal and said step of cooling comprises placing liquid nitrogen into said container.

9. A method as in claim 1 further comprising the step of removing said surface from placement adjacent said solid material after fluid contaminants have been cryo-adsorbed.

10. A method as in claim 1 further comprising the steps of:

monitoring the temperature at at least one position in said container; and removing said surface from placement adjacent to said solid material when said monitored temperature has risen to a predetermined level.

11. A method as in claim 1 further comprising the steps of:

monitoring the temperature at at least one position in said container; and removing said cryo-adsorbed contamination from said container after said monitored temperature has risen to a predetermined level.

12. A method as in claim 8 further comprising the steps of:

monitoring the temperature at at least one position in said container; and removing said container from said hole after said monitored temperature has risen to a predetermined level.

13. A method as in claim 12 further comprising the steps of:

placing said container removed from said hole into a chamber; and removing said adsorbed fluid contaminants from said container.

14. A method as in claim 13 further comprising the step of analyzing said removed fluid contaminants to determine their constituents 15. A method for removing molecules of contaminants from the ground comprising the steps of:

(a) providing a container for holding a cryo-adsorbing substance, said container having a surface across which molecules of contaminants may enter said container and having an inlet through which a cryogenic fluid may be introduced into said container;

(b) placing said cryo-adsorbing substance into said container;

(c) placing said container into the ground such that said surface is adjacent to the ground from which molecules of contaminants are to be removed; and (d) introducing a cryogenic fluid into said container through said inlet whereby said cryo-adsorbing substance adsorbs molecules of contaminants from the ground.

16. A method as in claim 15 wherein said surface of said container is provided with a plurality of openings through which said molecules of contaminants may enter.

17. A method as in claim 16 wherein the step of introducing a cryogenic fluid into said container through said inlet comprises a step of introducing liquid nitrogen into said container through said inlet.

18. A method as in claim 15 wherein said surface of said container is cylindrical, and said step of placing said container into the ground further comprises the step of forming an essentially cylindrical hole in the ground sized to accommodate said container into which said container is placed with said cylindrical surface adjacent said ground.

19. A method as in claim 15 further comprising the step of:

(e) removing said container from the ground after said cryo-adsorbing substance has adsorbed molecules of contaminants.

20. A method as in claim 15 further comprising the step of:

(e) regenerating said cryo-adsorbing substance by removing molecules of contaminants that have been cryo-adsorbed by said cryo-adsorbing substance.

21. A method as in claim 20 wherein the step of regenerating said cryo-adsorbing substance is accomplished by vacuum-pumping said cryo-adsorbing substance to cause said molecules to desorb from said cryo-adsorbing substance, said method further comprising the step of:

(f) collecting said desorbed molecules for subsequent disposal.

22. A method as in claim 15 further comprising the steps of:
   (e) monitoring for a predetermined value at least one of the following parameters while said container is placed into the ground: the amount of time said container is in the ground, or the temperature at a position within said container;
   (f) removing said container from the ground when said predetermined value is reached; and
   (g) desorbing said adsorbed molecules of contaminants from said substance.

23. A method as in claim 22 further comprising the steps of:
   (h) monitoring said desorbed molecules of contaminants to obtain an indication of the amount of contaminants cryo-adsorbed while said container was placed in the ground; and
   (i) using said indication to determine whether further contaminants should be removed from said ground.

24. A method as in claim 23 further comprising the step of:
   (j) repeating steps (b) through (j) if in step (i) it is determined that further contaminants should be removed from said ground.

25. A method as in claim 15 further comprising the steps of:
   (e) monitoring for a predetermined value the temperature at a position within said container; and
   (f) desorbing said adsorbed molecules of contaminants from said substance when said temperature reaches said predetermined level.

26. A method as in claim 25 wherein step (d) precedes step (c).

27. A method as in claim 1 wherein said step of cooling said cryo-adsorbing substance with respect to said solid material includes the steps of providing a tube within said container for holding a liquid and placing a liquid that is cool with respect to said solid material in said container to cool said cryo-adsorbing substance.

28. A method as in claim 15 further comprising the step of providing a tube within said container connected to said inlet for holding a fluid and wherein the step of introducing a cryogenic fluid into said container through said inlet is a step of introducing a cryogenic fluid into said tube through said inlet.

* * * * *